United States Patent [19]
Cocroft

[11] 3,854,407
[45] Dec. 17, 1974

[54] AERIAL TRAMWAY VEHICLE DRIVE AND CONTROL SYSTEM

[75] Inventor: Kelly H. Cocroft, Mesa, Ariz.

[73] Assignee: Skytram Systems, Inc., Scottsdale, Ariz.

[22] Filed: Apr. 4, 1973

[21] Appl. No.: 347,687

[52] U.S. Cl. .................. 104/112, 104/93, 105/153, 188/44
[51] Int. Cl. ....... B60b 17/02, B61b 7/06, B61h 7/12
[58] Field of Search ........... 152/382, 411, 412, 413; 104/89, 93, 112; 105/150, 153; 188/41, 44; 295/31 R

[56] References Cited
UNITED STATES PATENTS

| | | | |
|---|---|---|---|
| 1,663,690 | 3/1928 | Ellis | 295/31 R X |
| 3,353,503 | 11/1967 | Pettit | 105/150 |
| 3,369,501 | 2/1968 | Tsuchimochi | 105/150 |
| 3,446,158 | 5/1969 | Pettit | 105/153 X |

*Primary Examiner*—Lloyd L. King
*Assistant Examiner*—Howard Beltran
*Attorney, Agent, or Firm*—Strauch, Nolan, Neale, Nies & Kurz

[57] ABSTRACT

An aerial tramway vehicle having a novel hydraulic drive and control system for moving the vehicle and preventing runaway thereof, particularly on downhill slopes. The control system includes a manually operable braking system for use during normal vehicle operation and a fluid actuated emergency fail-safe braking system automatically operable under emergency conditions.

16 Claims, 20 Drawing Figures

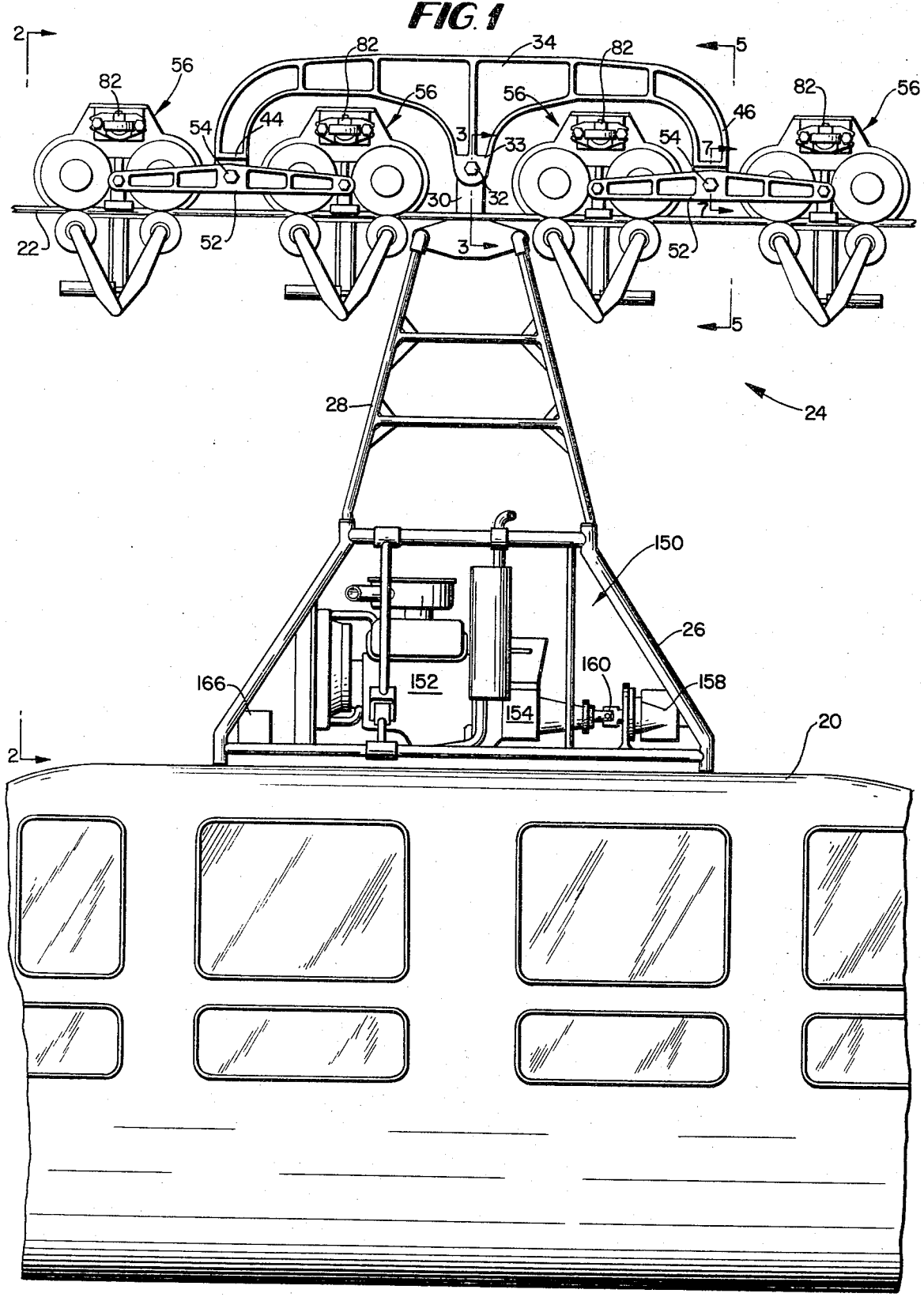

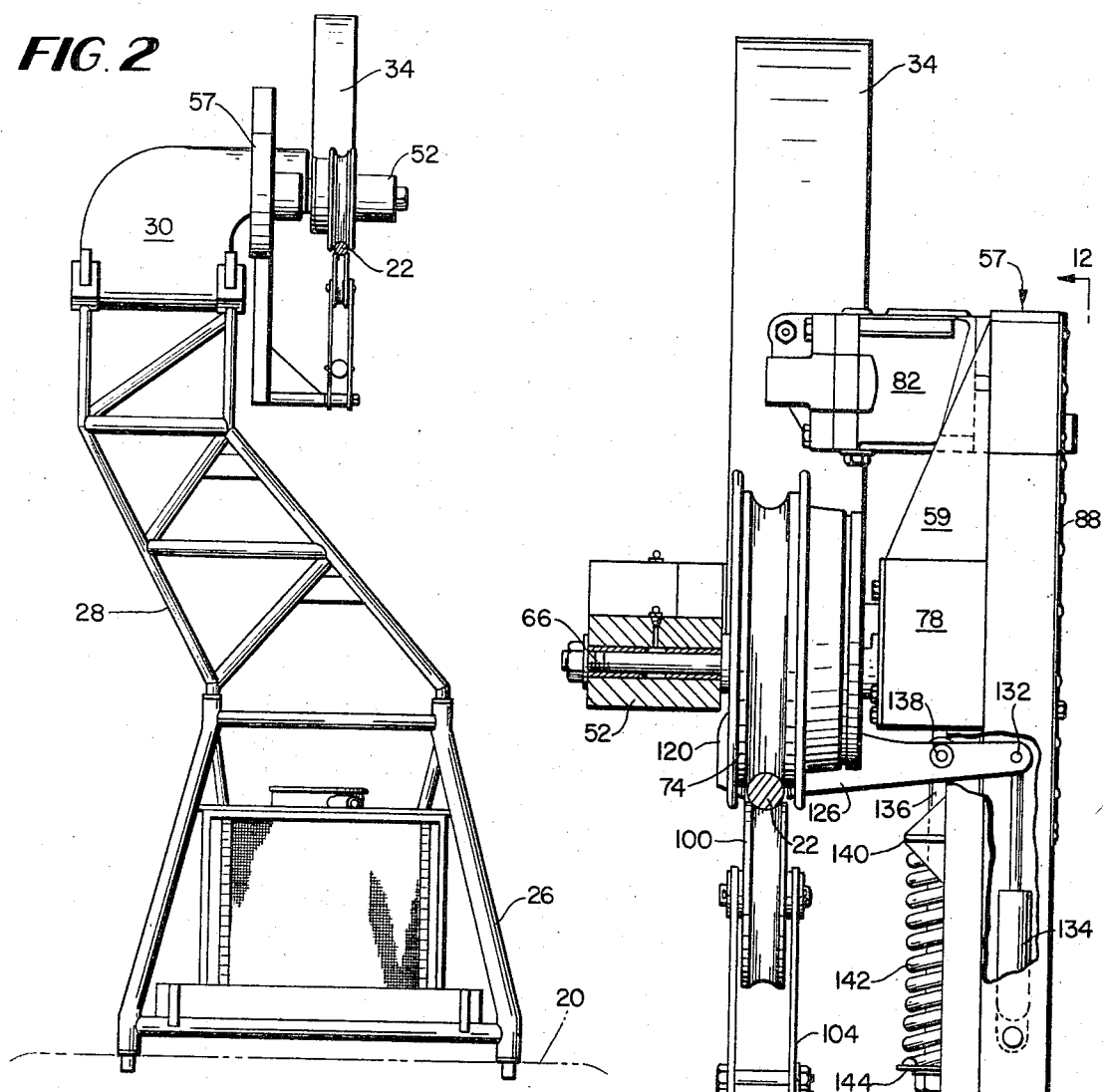
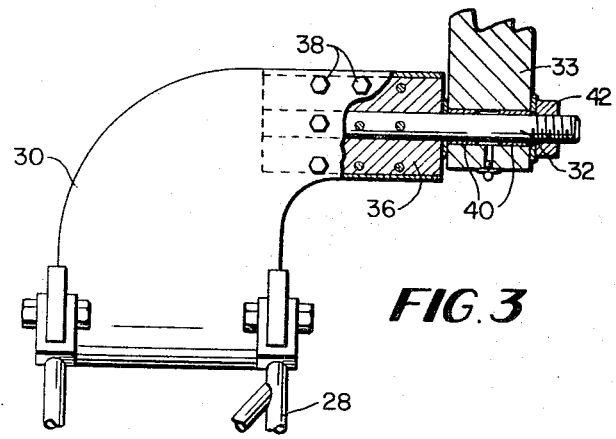

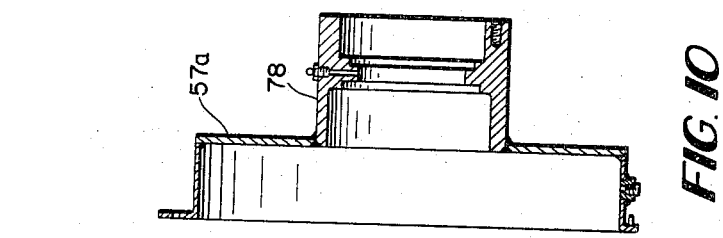
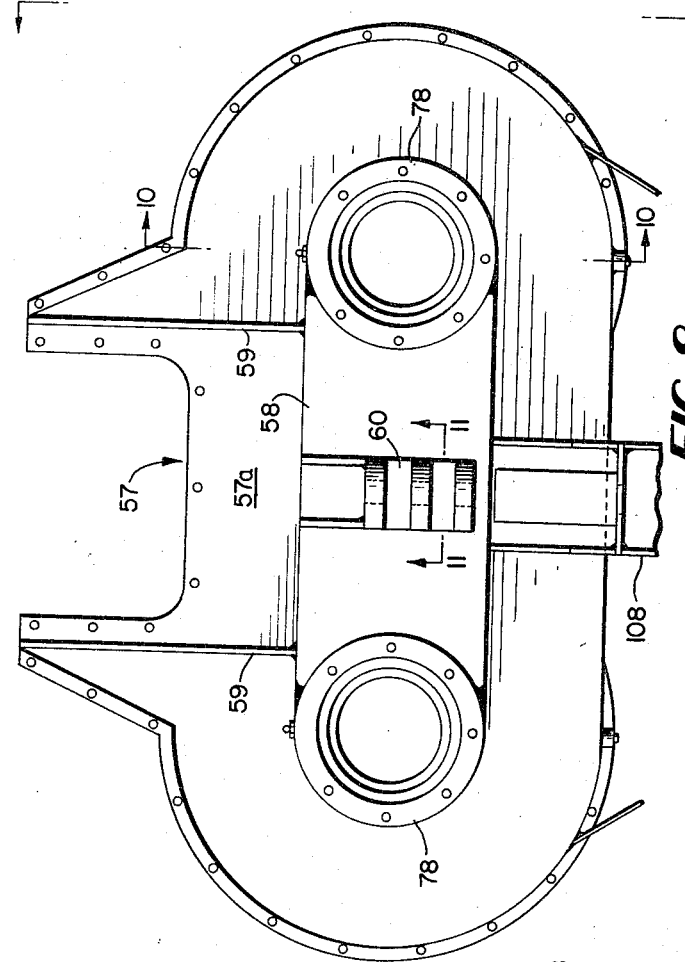
FIG. 8
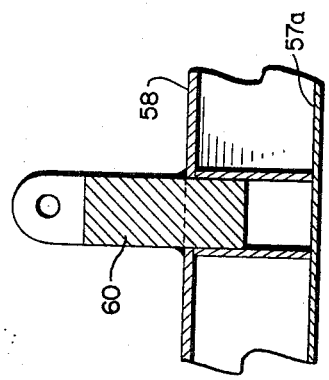
FIG. 10
FIG. 11
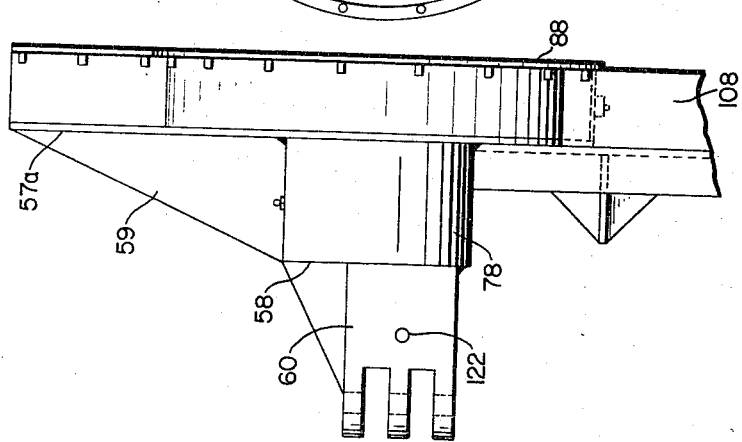
FIG. 9

MAXIMUM TORQUE
MINIMUM SPEED

MINIMUM TORQUE
MAXIMUM SPEED

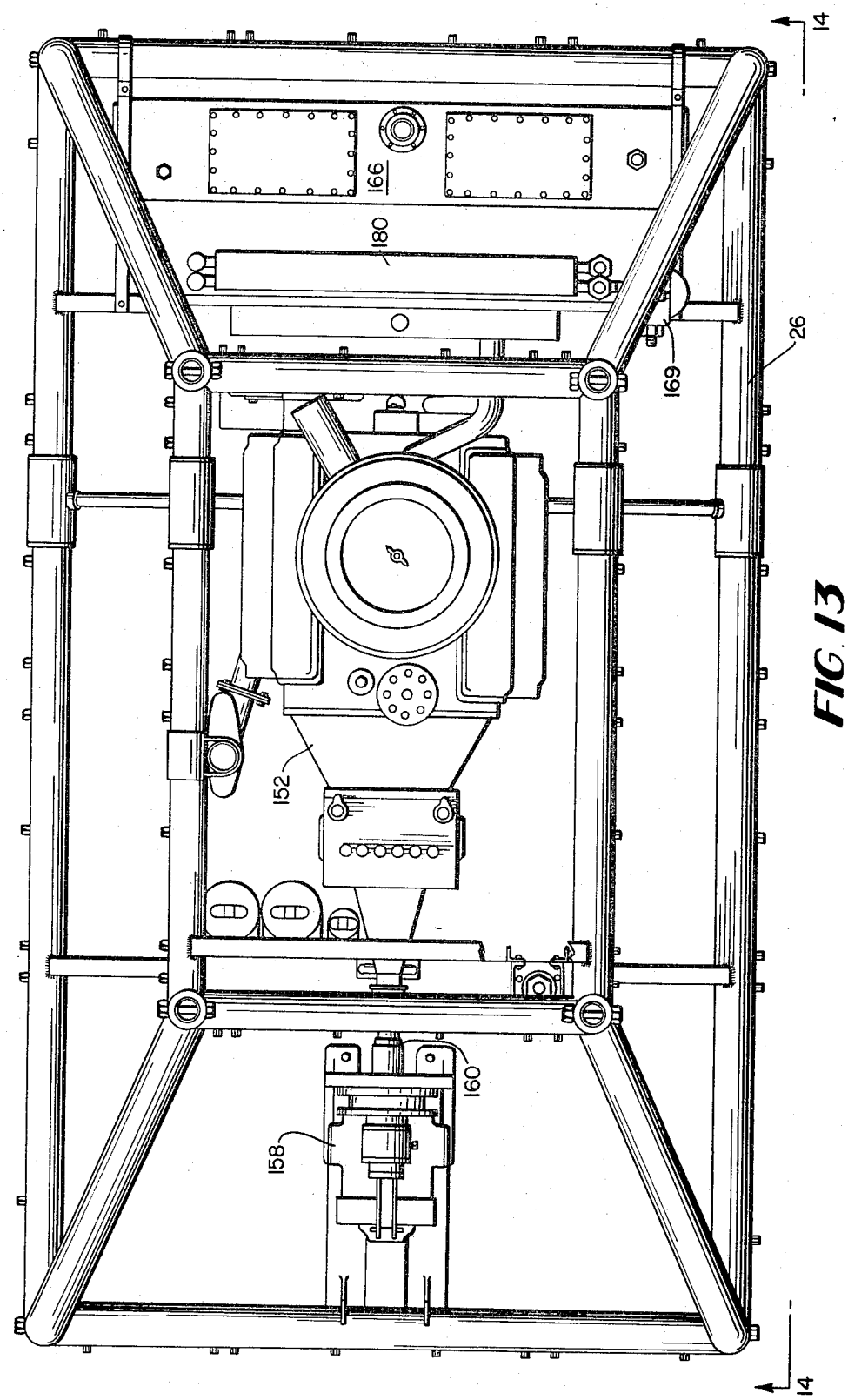

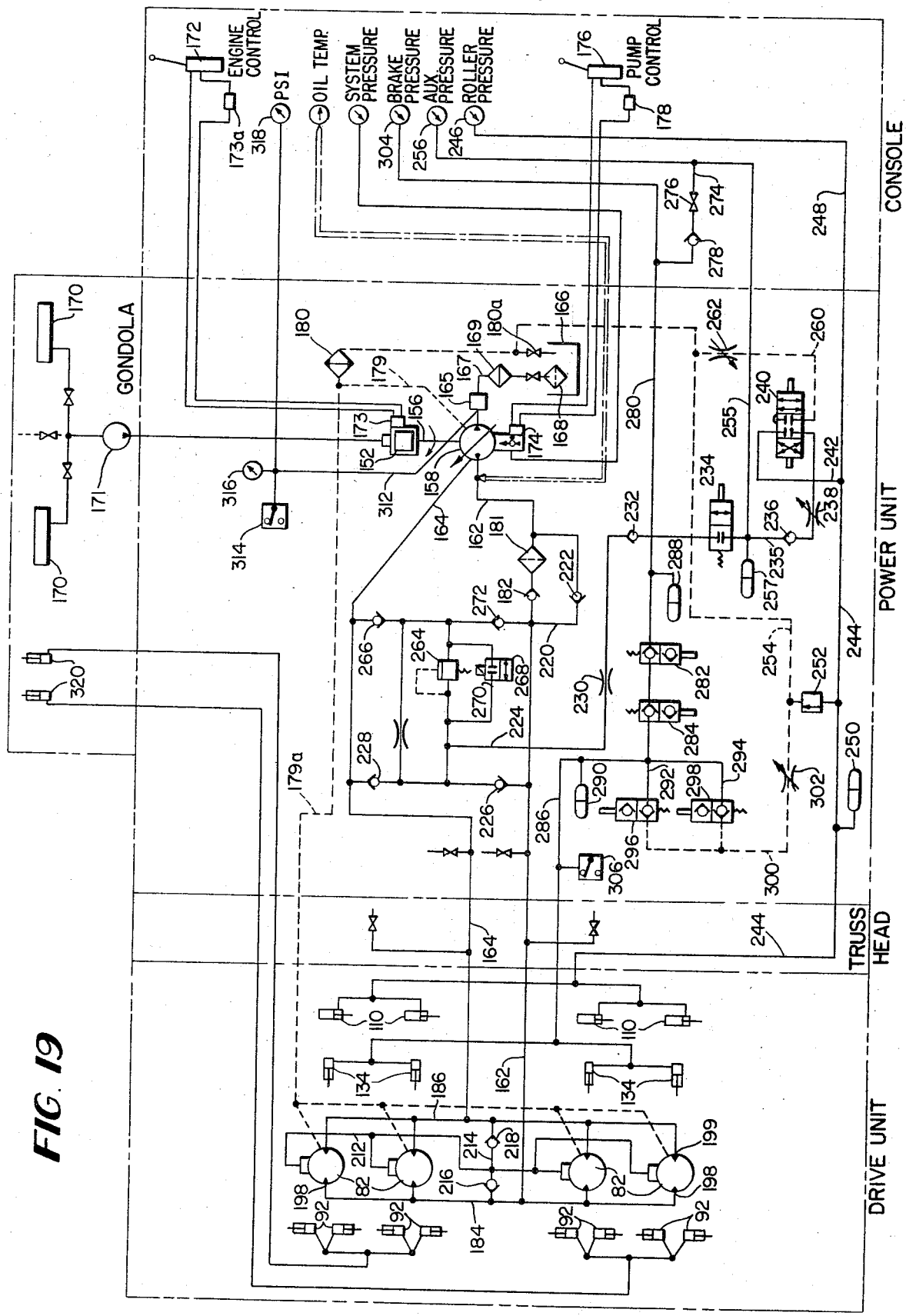

AERIAL TRAMWAY VEHICLE DRIVE AND CONTROL SYSTEM

BACKGROUND OF THE INVENTION

This invention relates generally to aerial tramway vehicles and more particularly to a novel drive and control system for such tramway vehicles.

Aerial tramway systems of the type with which the invention is concerned, include a fixed overhead cable and one or more passenger vehicles each independently driven along the cable by its own self-contained power and drive system. One such tramway system is illustrated in U.S. Pat. No. 3,353,503. Although the system described in that patent was much better than prior conventional systems, it was not totally satisfactory under certain operational conditions. Consequently, the novel drive and control system disclosed and claimed in this application was developed as a significant improvement over the system illustrated in U.S. Pat. No. 3,353,503.

SUMMARY OF THE INVENTION

Accordingly, a primary object of the invention resides in the provision of a novel drive and control system for aerial tramway vehicles which enable the vehicles to be operated in a safer and more reliable manner than was possible with prior known tramway systems.

Another object of the invention resides in the provision of a novel drive and control system for a tramway vehicle which includes a unique braking arrangement having a normal braking system which is manually operable under normal conditions to apply a braking action directly on the vehicle drive wheels, and an emergency braking system automatically operable under emergency conditions to stop movement of the vehicle.

Still another object of the invention resides in the provision of a novel tramway vehicle fluid drive and control system comprising a plurality of fluid motors drive connected to the drive wheels and capable of automatically applying variable torque to the wheels in response to load conditions on the wheels. The fluid motors are connected in the overall control system in such a way that, during downhill travel of the vehicle, they automatically prevent runaway of the vehicle by providing a fluid braking action on the wheels when a predetermined vehicle speed is reached.

A further object of the invention resides in the provision of a novel fluid drive and control system for a tramway vehicle wherein the novel automatic emergency brake control system is actuated to stop the vehicle upon failure of the main fluid drive circuit.

Still another object of the invention resides in the provision of a novel fluid drive and control system in which the plurality of fluid drive motors receive actuating fluid from a common, reversible variable capacity pump unit which includes a small supercharger pump that during normal operation provides make-up fluid to the main pump to compensate for normal leakage losses in the control system. The emergency braking system is activated in response to loss of fluid pressure at the outlet of the supercharger pump which occurs when the main fluid drive line breaks or when a main power engine unit stops. This form of emergency braking system affords automatic braking control under emergency conditions without interferring with operation of the fluid control and drive system under normal operating conditions, particularly when the vehicle is idling.

These and other objects and advantages of the invention will become more readily apparent from reading the following detailed description of a preferred embodiment of the invention wherein reference is made to the accompanying drawings in which like numerals indicate like elements. However, it is to be understood that the scope of the invention is not limited by the detailed description, but is determined by the appended claims.

BRIEF DESCRIPTION OF THE DRAWINGS

FIG. 1 is a side elevation view of a tramway vehicle incorporating the novel drive and control system of the invention;

FIG. 2 is an end elevation view taken generally along line 2—2 of FIG. 1 and illustrating the support structure by which the vehicle is suspended from a cable;

FIG. 3 is a fragmentary sectional view taken generally along line 3—3 of FIG. 1;

FIG. 5 is a fragmentary section view taken generally along line 5—5 of FIG. 1;

FIG. 8 is a side elevation view of the wheel unit housing similar to the showing of FIG. 4 but with the wheels and brake components removed;

FIG. 9 is an end view of the wheel housing taken generally along line 9—9 of FIG. 8;

FIG. 10 is a sectional view of the wheel housing taken generally along line 10—10 of FIG. 8;

FIG. 11 is a fragmentary sectional view taken generally along line 11—11 of FIG. 8;

FIG. 13 is a top plan view of the main engine power unit mounted on top of the passenger gondola;

FIG. 19 is a schematic diagram of the hydraulic control circuit employed to drive and control movement of the tramway vehicle along the overhead cable.

DETAILED DESCRIPTION OF THE INVENTION

Figure 4:
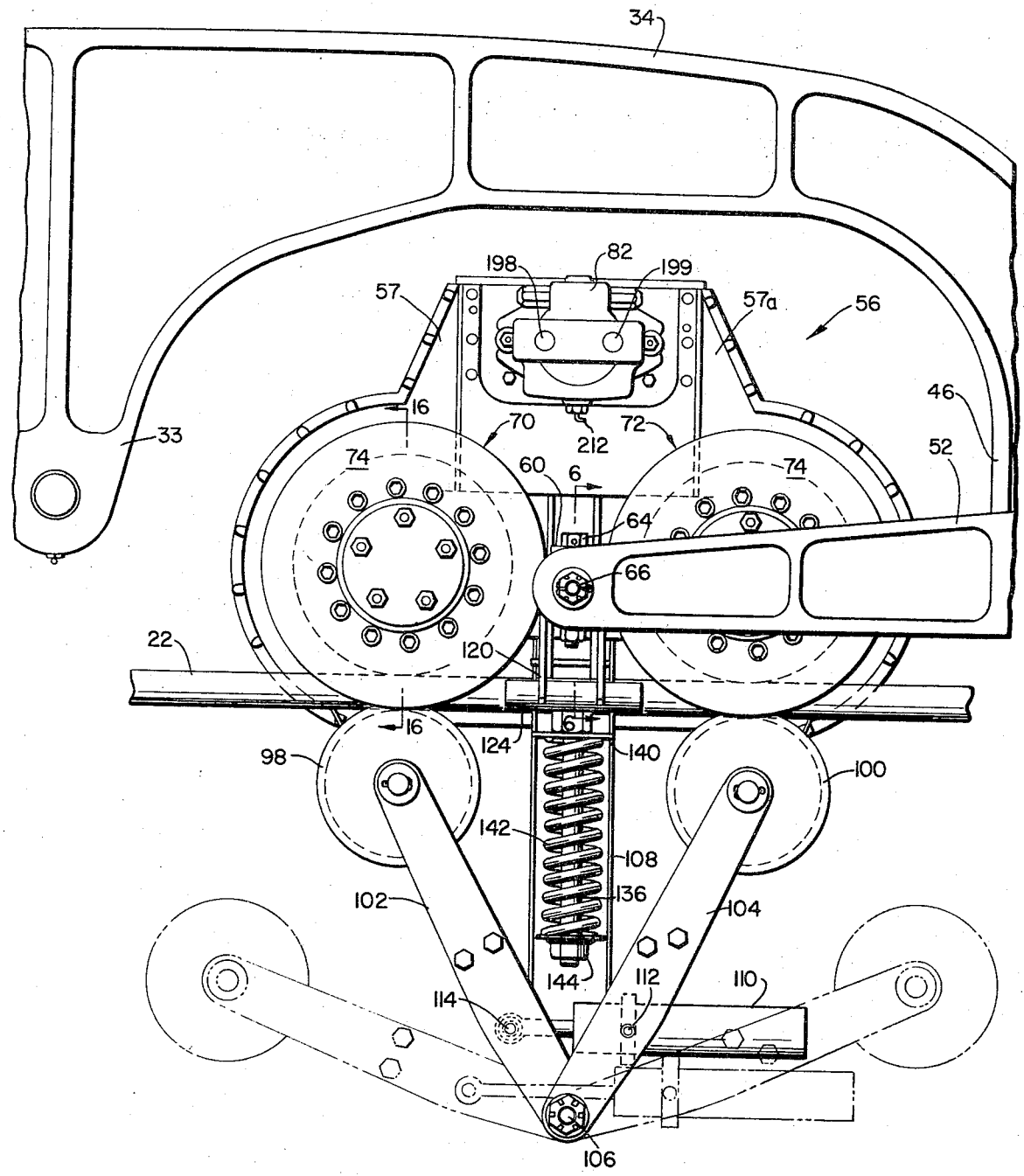
FIG. 4 is an enlarged fragmentary elevation view of a drive wheel unit for a tramway vehicle, with the bottom pressure rollers being illustrated in full line in their cable gripping position and in broken line in their release position.
Figure 6:
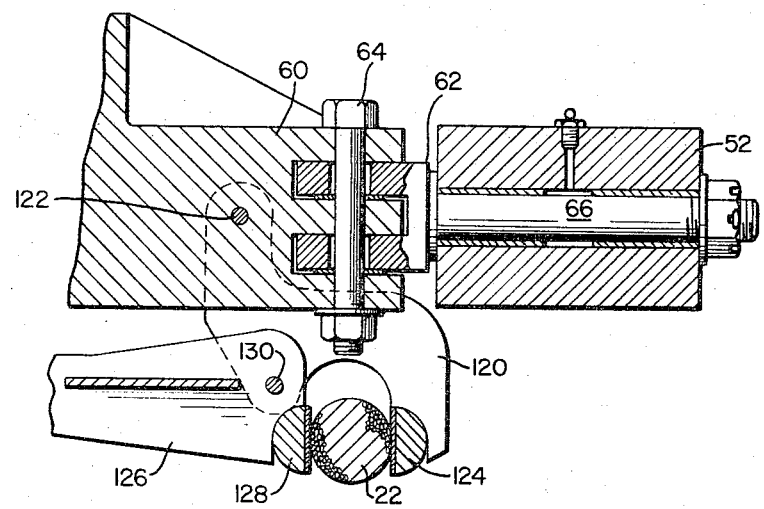
FIG. 6 is a fragmentary sectional view taken generally along line 6—6 of FIG. 4 and illustrating the emergency cable gripping brake unit which brakes the vehicle under emergency conditions.

As shown in FIGS. 1 and 2, the aerial tramway vehicle of the invention includes a passenger carrying gondola 20 suspended from an overhead track or cable 22 by a drive carriage and support assembly 24. Assembly 24 includes a tubular power unit frame 26 fixed to the top of gondola 20, a tubular support truss head assembly 28 fixed at its lower end to frame 26 and at its upper end to a tubular head member 30 which is pivotally connected by a head pin 32 to the central leg 33 of a yoke member 34. As best shown in FIG. 3, head pin 32 is fastened within head 30 via an insert 36 and bolts 38, with the outer end of the pin extending through sleeve bearings 40 mounted in leg 33 and retained therein by nut 42.

Figure 7:
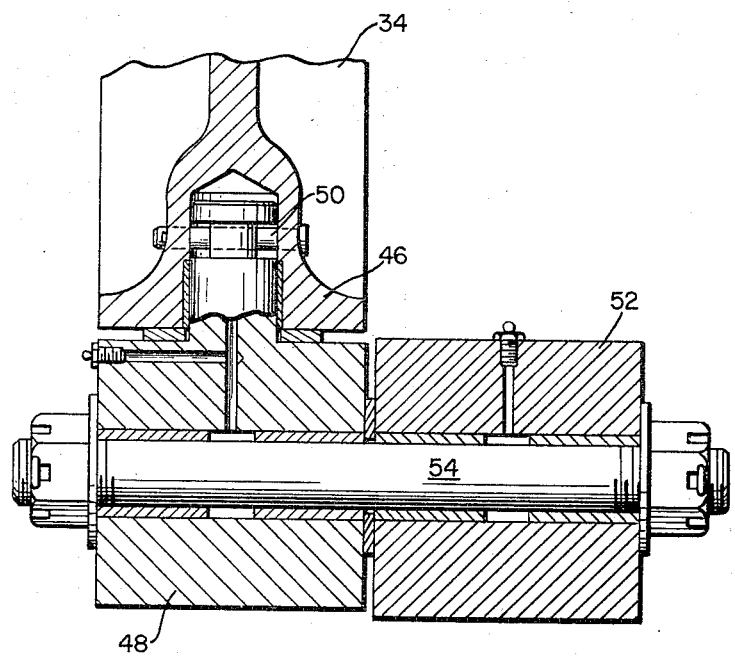
FIG. 7 is a fragmentary sectional view taken generally along line 7—7 of FIG. 1.

As shown in FIG. 7, each end leg 44 and 46 of yoke 34 has a foot 48 mounted therein for rotation about a vertical axis, with each foot being retained within the end leg by an offset pin 50. A spreader arm 52 is connected at its center point to each foot 48 by a transverse pivot pin 54 which forms a horizontal axis about which the spreader arm may pivot.

Mounted at opposite ends of each spreader arm 52 is a drive wheel unit 56, there being four such units by which vehicle 20 is supported from and driven along cable 22. As shown best in FIGS. 4, 6, and 8–11, each wheel unit 56 includes a housing 57 formed by a plate 57a, a box type frame 58 fixed to the front of plate 57a, and gusset plates 59. A clevice 60 projects forwardly from frame 58 and the inner end of a clevice pin 62 is retained within clevice 60 by bolt 64 for pivoting action about a vertical axis, while the outer shaft end 66 of pin 62 is connected to one end of a spreader arm 52 for pivoting action about a horizontal axis.

Each unit 56 includes a pair of drive wheel assemblies 70 and 72 (FIG. 16), each of which has a wheel 74 fixed on the outer end of shaft 76 which is rotatably mounted within a wheel bearing housing 78 projecting from the front of plate 57a and closing the ends of frame section 58. A drive spur gear 80 is mounted on the inner end of each shaft 78 behind plate 57a and gears 80 are driven from a common reversible, variable displacement hydraulic motor 82 (schematically illustrated in FIGS. 17 and 18) via pinion 84 and an intermediate gear assembly 86. Motors 82 are preferably commercially available Vickers motors, Model No. M-MVB29, and operation of the motors will be more fully described hereinbelow. A cover plate 88 normally closes the back of housing 57 to protect the drive gears.

Figure 16:
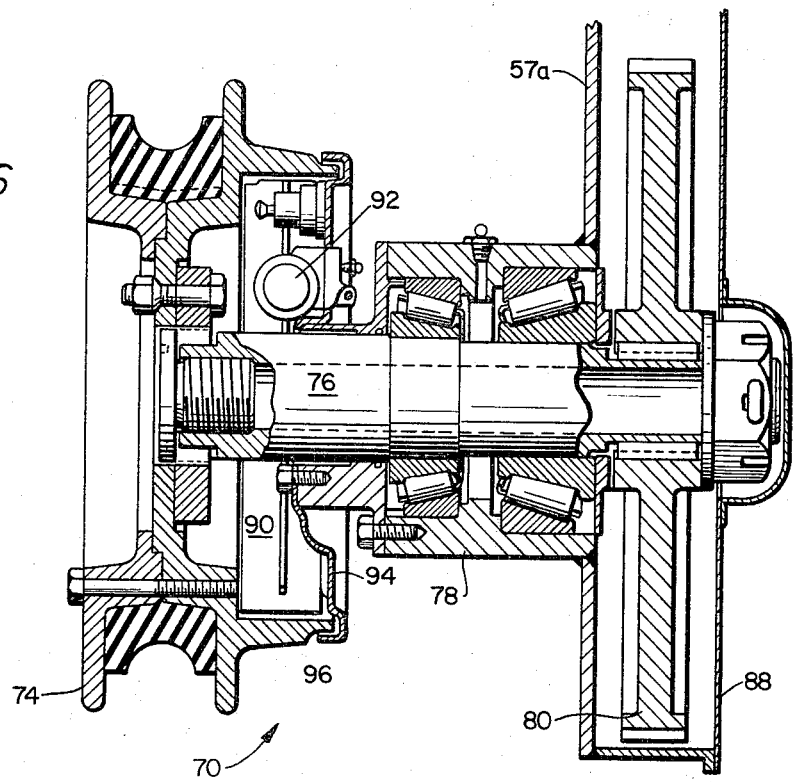
FIG. 16 is a fragmentary sectional view of a novel wheel assembly incorporated in the invention as viewed generally along line 16—16 of FIG. 4.

The novel and unique features of each wheel assembly shown in FIG. 16 and described thus far are not specifically claimed as part of the invention in this application, but are to be protected in a separate copending patent application.

A manually actuated brake assembly is provided for each wheel 74 and includes a pair of brake shoes 90 and a pair of fluid brake shoe actuators 92 which are mounted on a spider 94 that is fixed to bearing housing 78. In this way, an operator may normally manually apply a braking force directly against an annular flange 96 on the inner rim section of each of the wheels 74 to stop the vehicle when necessary.

Figure 12:
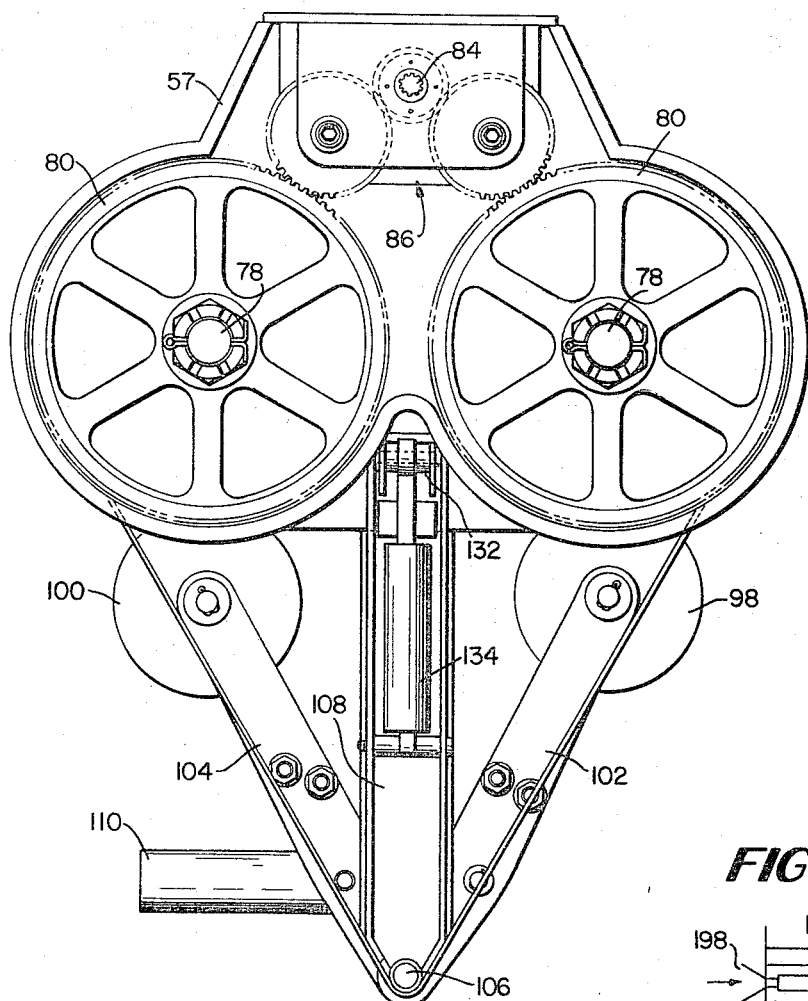
FIG. 12 is a rear elevation view of the wheel drive unit taken generally along line 12—12 of FIG. 5, but with the rear cover plate for the housing removed.

Each drive unit 56 also includes a pair of pressure rollers 98 and 100 (FIGS. 4, 5, and 12) rotatably mounted in the upper end of support arms 102 and 104, respectively. The arms are pivotally mounted at their lower ends on a common pivot pin 106 fixed to the bottom of a vertical support column 108 which extends downwardly from housing 57. Rollers 98 and 100 are actuated between a release position shown in broken line in FIG. 4 to a cable engaging position shown in full line by a hydraulic actuator 110 which has its cylinder pivotally connected at 112 to arm 104 and its piston pivotally connected at 114 to arm 102. Consequently, when actuating fluid is applied to actuator 110, rollers 98 and 100 are moved into their cable engaging position in which they provide a sufficient friction gripping force between drive wheels 74 and cable 22 to drive the vehicle along the cable. The frictional gripping force may be varied by varying the fluid pressure applied to actuator 110.

An emergency braking system (FIGS. 4–6 and 12) is also associated with each drive unit 56 and includes an outboard brake arm section 120 pivoted at 122 to clevice 60 and having an elongated brake pad 124 for engaging one side of cable 22. An inboard brake arm section 126 has a brake pad 128 for engaging the other side of cable 22. Arm section 126 has its outer end pivotally connected at 130 to arm 120 and its inner end pivotally connected at 132 to a hydraulic actuator 134 mounted within column 108. A brake rod 136 is also pivotally connected at 138 to arm 126. The rod slidably extends through a plate 140 fixed to column 108, and a coil spring 142 surrounds the rod and extends between plate 140 and a nut and washer assembly 144 threaded on the lower end of the rod.

The emergency braking system operates in a fail-safe manner during normal operation of the vehicle and the fluid drive and control circuit to be described hereinafter. Pressurized fluid is delivered to each actuator 134 to force its piston rod upwardly and thereby pivot arms 126 and 120 in such a manner that brake pads 124 and 128 are released from cable 22. Because actuators 134 are energized, brake rods 136 will be raised to compress springs 142. If the main fluid drive and control circuit should fail to create an emergency condition, actuators 134 are deactivated and brake pads 124 and 128 are slammed against cable 22 by springs 142.

Referring now to FIGS. 1, 13–15 and the hydraulic control circuit of FIG. 19, the power unit assembly 150 for driving fluid motors 82 comprises a conventional water cooled internal combustion engine 152, e.g., a Chevrolet V-8 327 engine which by way of a 3-speed transmission 154 drives an output shaft 156. A reversible, variable displacement hydraulic pump 158 is driven from shaft 156 via coupling 160 and delivers oil in a closed circuit through either of conduits 162 or 164 to drive motors 82 in either a forward or reverse direction. Pump 158 is a conventional pump and preferably is a Dynapower Model 60 standard variable pump. It includes a low flow supercharger pump section 165 which provides make-up oil to the main pump section from a reservoir 166 via line 167, strainer 168, and filter 169. Supercharger 165 provides a low flow sufficient to make up for normal flow loss in the main closed hydraulic circuit due to normal component leakage losses, lubrication losses, etc., and prevents cavitation in pump 158. Instead of being mounted directly on the shaft of main pump 158 as in the preferred Dynapower pump, supercharger 165 may be a separate pump driven independently from engine 152.

Referring particularly to FIG. 19, engine 152 receives fuel from one of the tanks 170 and fuel pump 171. The engine is controlled manually by a remote hydraulic master control unit 172 which is mounted on the operator's console and which operates a slave unit 173 that is connected to the engine. An oil filler and bleeder device 173a is mounted in the hydraulic line. Engine output shaft 156 then drives pump 158 and supercharger 165. The direction of rotation of pump 158 and the pressure of the oil delivered by the pump is selected by a servo control actuator and slave unit 174 which is operated by a manual hydraulic vehicle direction and speed control unit 176 mounted on the console. An oil filter and bleeder device 178 is mounted in this hydraulic circuit.

During operation, a small amount of lubricating oil is normally drained through pump 158 and motors 82 via lines 179 and 179a to oil cooler 180 and valve 180a back to reservoir 166. As noted above supercharger 165 makes up this drain flow to pump 158.

With control unit 176 and pump 158 adjusted to move vehicle 20 in a forward direction, pressurized oil is delivered through main drive line 162, in which oil filter 181 and check valve 182 are mounted, to a forward inlet line 184 connected to one port 198 of each of the four drive motors 82. Oil is exhausted from the motors by another port 199 and returned to the inlet of pump 158 by conduits 186 and 164.

Figure 17:
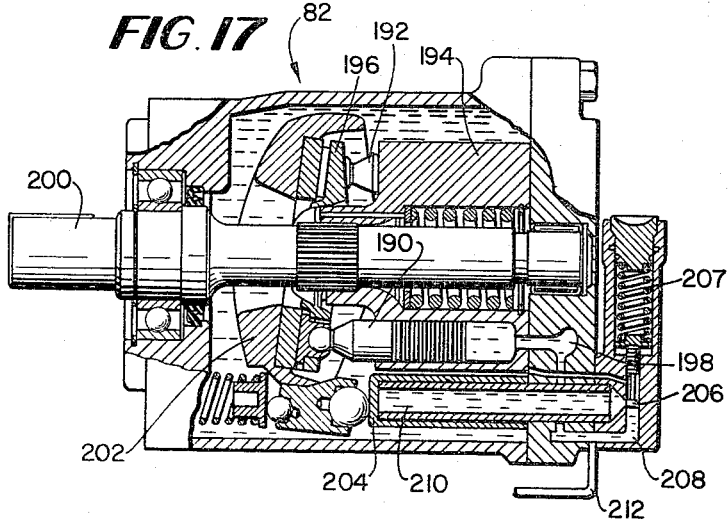
FIG. 17 is a schematic illustration of the fluid drive motors for driving the vehicle wheels.
Figure 18A:
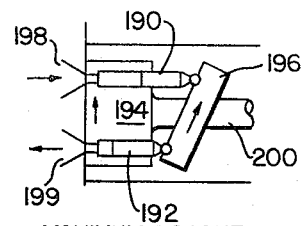
FIGS. 18A and 18B are schematic illustrations showing the position of the swash plate when the motors of FIG. 17 are producing maximum and minimum torque, respectively.
Figure 18B:
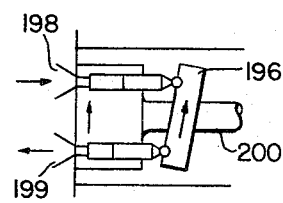
Figure 14:
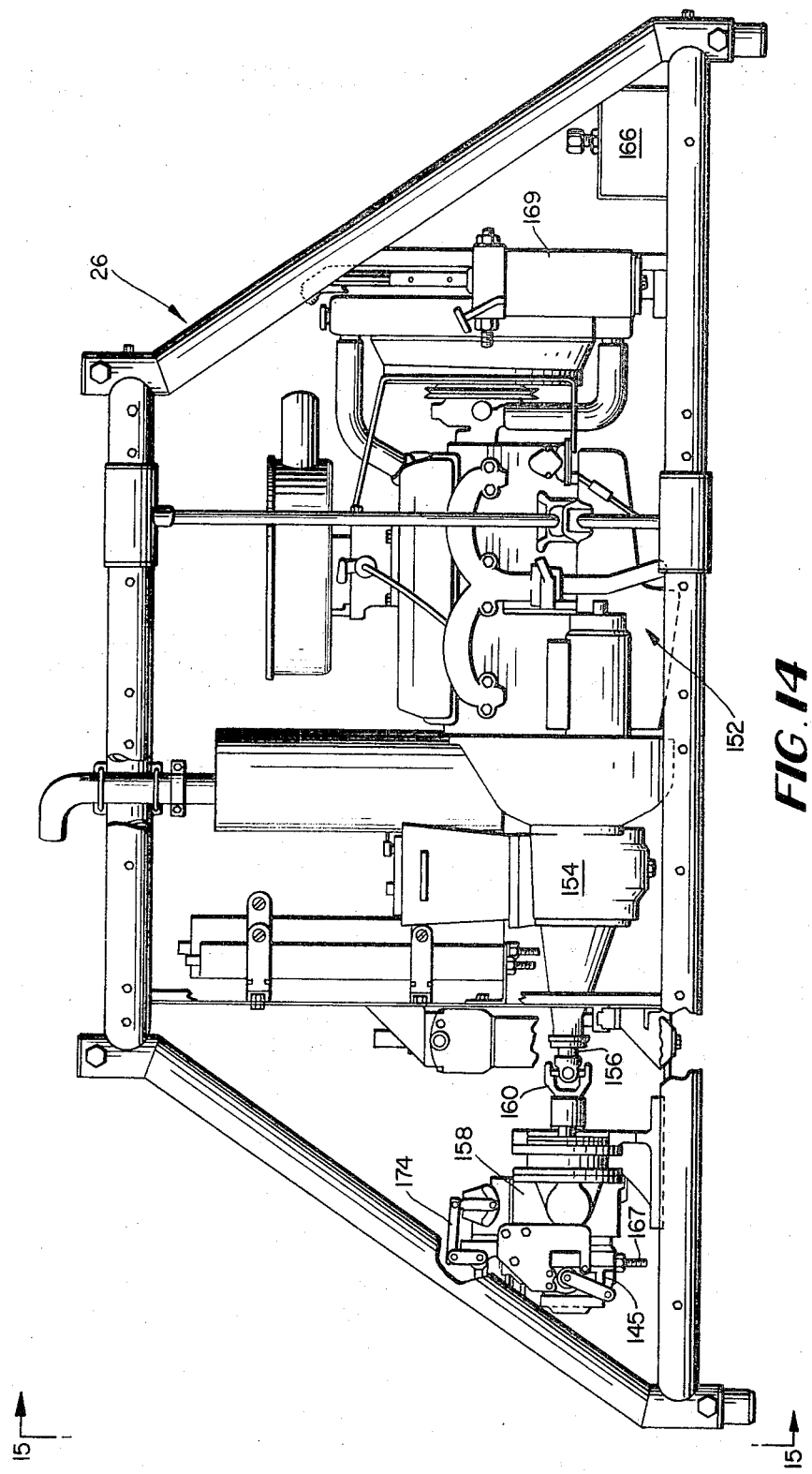
FIG. 14 is a side elevation view of the power unit taken generally along line 14—14 of FIG. 13.
Figure 15:
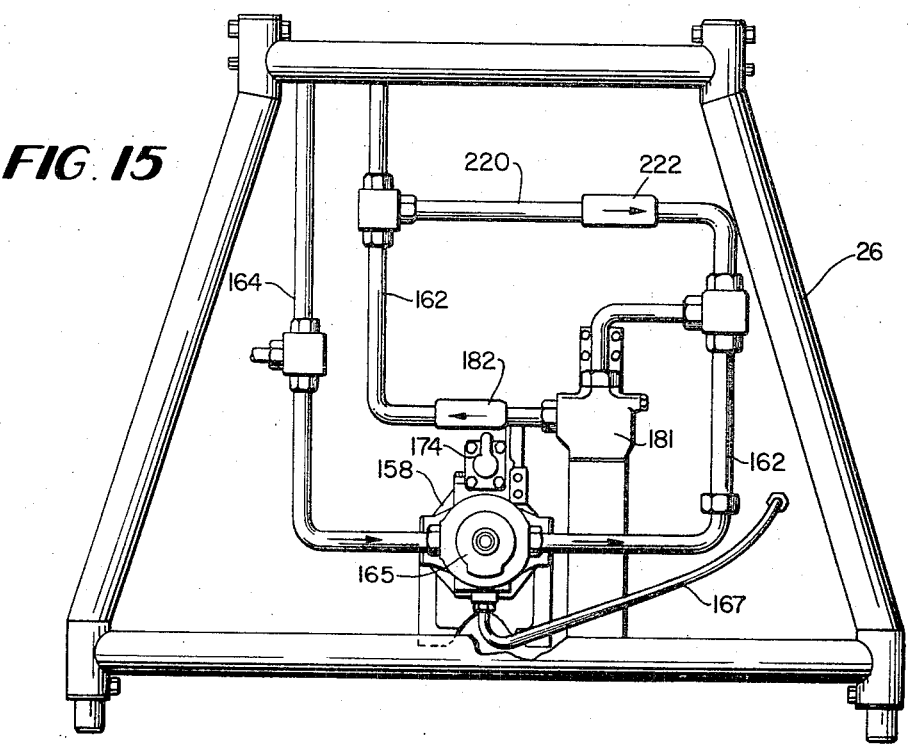
FIG. 15 is an end elevation view of the main hydraulic pump as viewed generally along line 15—15 of FIG. 14.

As discussed hereinabove, motors 82 (schematically shown in FIGS. 17, 18A and 18B) are commercially available Vickers motors but are incorporated in the drive units 56 of the invention in a novel manner. Each of the motors is a reversible, variable displacement type motor and includes a pair of reciprocating pistons 190 and 192 mounted in a rotor 194 and connected together by a swash plate 196. Each motor has a first port 198 connected to conduit 184 and a second port 199 connected to conduit 186. The reciprocating motion of pistons 190 and 192 produces rotary motion of rotor 194 and output shaft 200 on which a pinion 84 is mounted. Swash plate 196 is mounted on a swinging yoke 202 which is mechanically adjusted by a spring loaded actuating piston 204 that is moved in response to variations in operating pressure. As shown in FIGS. 18A and 18B, increasing the swash plate angle increases the torque capability of the motor, but reduces the speed of drive shaft 200. Conversely, reducing the swash plate angle reduces the torque capability but increases drive shaft speed.

A compensator, spool-type control valve 206, biased in a closed direction by an adjustable spring 207, intersects a fluid passage 208 which extends between the forward inlet port 198 and the pressure chamber 210 of actuating piston 204. The compensator control automatically varies the motor displacement in response to changes in work load on output shaft 200. Any load increase on shaft 200 is accompanied by a corresponding operating pressure increase as a result of the additional torque requirements. At a predetermined fluid pressure in inlet 198 and passage 208, spool 206 will open to pass pressurized oil into the chamber 210 and thereby displace piston 204 to the left as viewed in FIG. 17 and increase the angle of swash plate 196. The torque is thus automatically increased and the output shaft speed automatically decreased under a heavy load. Conversely, under a light load the inlet pressure decreases, swash plate 196 assumes a minimum angle position (FIG. 18B), compensator valve 206 remains closed, and the speed of drive shaft 200 is increased.

The details of motors 82 and their operation described thus far are conventional. When these motors are incorporated into the novel drive and control system of the invention an important addition is made in the compensator circuit. As shown in FIGS. 17 and 19, a pressure sensing line 212 is connected between passage 208 in each of the motors 82 and a conduit 214, which connects with conduits 184 and 186 through check valves 216 and 218, respectively.

During initial start up of the vehicle from a rest position and also during uphill travel of the vehicle when the load conditions on the output shaft 200 of each of the motors 82 is maximized, a buildup in operating pressure in lines 162 and 184, port 198, and passage 208 and causes valve 206 to open to pass pressurized oil into chamber 210. This causes swash plate 196 to assume the position shown in FIG. 18A wherein the motors produce a maximum torque required to overcome the load. As the load decreases, the operating pressure gradually decreases and the speed of the vehicle is automatically increased as the angle of the swash plate is decreased through operation of compensator 206 and actuating piston 204.

When the vehicle starts to move downhill and there is no load on shafts 200, the oil pressure in line 162 and port 198 is rapidly reduced which means that there is no pressure coming through line 162 which could act to open the compensator valve 206. With valve 206 closed and the vehicle increasing in speed under gravity as it travels downhill, the motors 82 start to act as pumps and develop a substantial back pressure in the return line 186. This back pressure is transmitted through check valve 218, conduit 214, and the pressure sensing line 212 to each motor passage 208 and acts against the spool valve 206. When this sensing back pressure then reaches the set compensating pressure of valve 206, the valve will open to transmit the back pressure into chamber 210. Actuating piston 204 will then increase the angle of swash plate 196 to decrease the speed of rotation of shaft 200 and thereby automatically apply a fluid braking force to the vehicle. In this way, the pressure sensing line 212 causes motors 82 to automatically prevent the vehicle from running away. This is very significant in aerial tramway systems where uphill and downhill slopes quite frequently are very steep.

When the vehicle is operated in a reverse direction, motors 82 operate in the same manner, except that lines 164 and 186 would be inlet lines, while lines 184 and 162 would be return lines. When the vehicle is travelling downhill, the pressure sensing line 212 will then communicate with the back pressure in return line 184 by way of the check valve 216 to cause motors 82 to apply a reverse thrust or fluid braking force to the vehicle in the same manner as described hereinabove. When the vehicle is driven in the reverse direction and line 162 is a fluid return line back to pump 158, the return fluid bypasses filter 181 by way of a bypass line 220 and check valve 222.

As discussed hereinabove, during normal operation of the vehicle, pressure rollers 100 are maintained in tight frictional engagement with cable 22 by the fluid actuators 110. Pressurized actuating fluid is delivered to actuators 110 by way of an auxiliary tap line 224 which communicates with the main lines 162 and 164 by way of check valves 226 and 228, respectively. Fluid passes through line 224 to flow control valve 230, check valve 232, and a normally closed solenoid operated valve 234. A conduit 235 passes oil from valve 234 through a check valve 236 and a flow control valve 238 to a normally closed solenoid operated valve 240. Lines 242 and 244 connect valve 240 to actuators 110.

In FIG. 19, solenoid valves 234 and 240 are shown in their normally closed positions. To actuate cylinders 110, these valves will be energized manually and moved leftward to their open positions so that oil will pass to the cylinders from line 224. When the cylinders 110 are fully actuated and pressure rollers 98 and 100 tightly engage cable 22 to a desirable degree as indicated by a roller pressure indicator 246 which communicates with line 244 via line 248, solenoid valves 234 and 240 will be deenergized back to their closed positions and the pressurized fluid in line 244 will be trapped to maintain cylinders 110 in their actuated position. An accumulator 250 is connected to line 244 and affords the pressure rollers with a limited degree of resiliency should they encounter thickened or nonuniform portions of cable 22. A pressure relief valve 252 connects line 244 to a drain line 254 that extends back to oil reservoir 166. The oil pressure in line 235 immediately downstream of valve 234 is indicated by a line 255 and a pressure indicator 256. An accumulator 257 is connected to line 235.

Should it become necessary or desirable to deactivate cylinders 110 and thereby move the pressure rollers to their broken line position shown in FIG. 4, solenoid valve 240 may be energized toward the right of its position shown in FIG. 19, wherein the line 242 will then communicate with a drain line 260 which connects to the drain line 254 by way of the flow control valve 262. Thus the oil in line 244 may be drained back to the reservoir and the pressure rollers 98 and 100 are disengaged from cable 22.

The pressure in the auxiliary tap line 224 is controlled by a pressure relief valve 264 which dumps excessive pressure back to the main pump return line 164 by way of check valve 266. A solenoid operated valve 268 is provided in a bypass line 270 for bypassing relief valve 264.

Should the pump 158 be operated in a reverse direction whereby fluid is delivered through line 164 to motors 82, the auxiliary tap line 224 then receives pressurized fluid from line 164 through check valve 228, and any fluid dumped through relief valve 264 is passed to return line 162 by way of check valve 272.

The emergency braking system and specifically the hydraulic cylinders 134 also receive actuating fluid from the auxiliary line 224. A brake tap line 274 is connected to line 255 and passes oil through a manual shut off valve 276 and a check valve 278 to a line 280. The oil then passes through solenoid actuated valves 282 and 284 and line 286 to the hydraulic actuators 134. An accumulator 288 is connected to line 280 and another accumulator 290 is connected to line 286. Fluid may be drained from line 286 by way of lines 292, 294 and solenoid valves 296, 298 which connect to a drain conduit 300 that, by way of a flow controller 302, connects to the drain conduit 254. A brake pressure indicator 304 is connected to line 280 and a pressure sensing switch 306 is connected to line 286. Switch 306 when activated indicates that a sufficient pressure is developed in line 286 and cylinders 134 to release and maintain the emergency braking pads 124 and 128 from engagement with cable 122.

Solenoid valves 282, 284, 296 and 298 are illustrated in their normally deenergized positions so that fluid may pass from line 280 through valves 282 and 284 to line 286 and on to cylinders 134. However, fluid flow through lines 292 and 294 is normally blocked by the normally closed valves 296 and 298. Initially during start up, and operator will release the emergency braking system by manually opening valve 276 and permitting pressurized oil to flow through line 274, lines 280 and 286 onto cylinders 134. When sufficient pressure has built up in line 286 as indicated by the pressure switch 306 to release the emergency braking system, manual valve 276 will be closed and fluid is then trapped in lines 280 and 286 and cylinders 134. The emergency brakes are then retained in an inoperative position out of engagement with cable 22 and coil springs 142 are maintained in a compressed condition.

When an emergency situation arises, such as when operating pressure in the main drive lines 162 and 164 is lost due to a break in the lines or upon failure of engine 152, the emergency braking system is automatically operated. When a loss in main line pressure occurs, supercharger 165 attempts to supply additional oil to pump 158 to make up the loss, but its capacity is insufficient to do so. Consequently, the output pressure from supercharger 165 will rapidly drop to zero and this decrease is sensed by a line 312 which connects between the discharge side of the supercharger and a pressure switch 314 and pressure indicators 316 and 318. Switch 314 is normally maintained in an open position by the pressure normally prevailing in line 312 and at the supercharger discharge. The switch is actuated from an open to a closed position when the pressure in line 312 drops to zero or a predetermined value above zero. Closure of switch 314 automatically energizes solenoid valves 282 and 298 to automatically apply the emergency brakes. Energization of valve 298 to an open position immediately drains the cylinders 134 through lines 286 and 294 and the brakes are rapidly applied by expansion of the compressed coil springs 142. Energization of solenoid valve 282 to a closed position isolates the accumulator 288 from the drain operation and traps pressurized fluid in line 280 and the accumulator 288. This feature enables the operator to subsequently manually deenergize valves 282 and 298 and sufficiently release the emergency brakes by again actuating cylinders 134 by the fluid pressure trapped in accumulator 288 to enable the vehicle to be brought to a safe location along the cable.

Should the main power engine 152 fail during operation, pump 158 and supercharger pump 165 will cease operation and the output pressure from the supercharger pump as sensed through line 312 will drop to zero. Pressure switch 314 will move to a closed position to energize solenoid valves 282 and 298 and thereby cause the emergency braking system to operate in the same manner as described hereinabove.

Thus, during normal operation of the main hydraulic operating circuit, pressure switch 314 is maintained in an open position by the normal pressure of the fluid discharged from supercharger pump 310. However, should either one of the main lines 162 or 164 fail, switch 314 is closed in response to zero pressure from the discharge of the supercharger to automatically apply the emergency braking system. Similarly, should the main engine 152 fail and the outlet pressure from the supercharger drop to zero, switch 314 will close to effect operation of the emergency braking system.

The supercharger pump 165 advantageously affords automatic operation of an emergency braking system that responds to the abnormal loss of operating pressure in the main drive lines of the hydraulic control system, but does not interfere with normal manual operation and control of the system. For example, if switch 314 were operated in direct response to the pressure in either of the main lines 162 or 164, the emergency braking system would be activated each time the vehicle was stopped at an engine idle condition, such as during the loading and unloading of passengers. This is undesirable and is avoided by the invention, since the supercharger 165 continues to operate while the vehicle is idling to thereby provide a pressure in line 312 sufficient to retain switch 314 in its open position.

Solenoid valves 284 and 296 are normally positioned as shown in FIG. 19 and are back-up valves for automatic valves 282 and 298. Should valves 282 and 298 fail to operate when needed, valves 284 and 296 may be manually operated to apply the emergency brakes.

During normal operation of the vehicle, the emergency braking system remains inactive. A moving vehicle is normally brought to a stop by application of brake shoes 90 directly against the flange 96 on each of the wheels 74. This is accomplished by manually activating hydraulic master cylinders 320 to activate cylinders 92 and thereby apply the brake shoes against the wheel. Thus, the overall braking arrangement for the vehicle includes the manually operable system acting directly on wheels 74 during normal operation of the vehicle, and the automatic emergency braking system which acts against cable 22 under emergency conditions but does not interfere with normal operation of the vehicle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An aerial tramway system comprising overhead track means, a vehicle, carriage means including wheel means suspending said vehicle from said track means, control means including fluid motor means drive connected to said wheel means for moving said vehicle along said track means, a fluid control circuit for supplying actuating fluid to said motor means, and pressure sensing means responsive to the pressure of the fluid discharged from said motor means to cause said motor means to automatically apply a fluid braking force to said wheel means when said discharge pressure reaches a predetermined value, thereby preventing runaway of said vehicle.

2. An aerial tramway system as defined in claim 1, said fluid motor means being of the variable displacement type and including compensator control means which varies the motor displacement in response to changes in the work load on said motor means, and said pressure sensing means cooperating with said compensating means to cause said motor means to apply said fluid braking force.

3. An aerial tramway system comprising overhead track means, a vehicle, carriage means including wheel means suspending said vehicle from said track means, control means including fluid motor means drive connected to said wheel means for moving said vehicle along said track means, a fluid control circuit having a main pump for supplying actuating fluid to said motor means, a fluid reservoir, a supercharger pump for supplying makeup fluid from said reservoir to said main pump, a normally inoperative emergency braking system adapted to stop movement of said vehicle along said track means, and actuator means responsive to the pressure of the fluid discharged from said supercharger pump to automatically operate said emergency braking system under emergency conditions.

4. An aerial tramway system as defined in claim 3, wherein said actuator means responds to a loss in pressure at the discharge of said supercharger pump to operate said emergency braking system.

5. An aerial tramway system as defined in claim 3, comprising a manually operative braking system mounted on said carriage means and used during normal operation of said vehicle to brake said vehicle.

6. An aerial tramway system as defined in claim 5, wherein said manually operative braking system includes brake means mounted on said wheel means for applying a braking effort directly on said wheel means, and wherein said emergency braking system includes brake members mounted on said carriage means and adapted to engage said track means.

7. An aerial tramway system as defined in claim 3, said fluid control circuit including pressure sensing means responsive to the pressure of the fluid dischaged from said motor means to cause said motor means to automatically apply a fluid braking force to said wheel means when said motor discharge pressure reaches a predetermined value, thereby preventing runaway of said vehicle.

8. An aerial tramway system as defined in claim 7, said motor means being of the variable displacement type and including compensator control means which varies the motor displacement in response to changes in the work load on said motor means, and said pressure sensing means cooperating with said compensating means to cause said motor means to apply said fluid braking force.

9. An aerial tranway system as defined in claim 7, wherein said main pump and said fluid motor means are reversible so that said vehicle may be moved in either a forward or reverse direction along said track means.

10. An aerial tramway system comprising overhead track means, a vehicle having a prime mover, carriage means including wheel means suspending said vehicle from said track means, fluid motor means drive connected to said wheel means for moving said vehicle along said track means, a fluid control circuit connected to be energized by said prime mover for supplying actuating fluid under pressure to said motor means, an emergency braking system including means adapted to grippingly engage said track means and fluid pressure responsive actuator means for said track gripping means, means supplying a control pressure from said circuit to said actuator means, said actuator means being adapted to maintain said track gripping means inoperative when said control pressure is above a predetermined level and to operate said track gripping means upon abnormal loss of pressure in said circuit, and said control pressure supplying means being effective to maintain said control pressure above said level during normal low pressure operational conditions in said circuit as when the prime mover is idling with the vehicle at a station.

11. An aerial tramway system as defined in claim 10, wherein a manually operable fluid pressure braking system is associated with said wheel means for applying braking effort directly against said wheel means during all conditions of operation of said vehicle.

12. An aerial tramway system comprising overhead track means, a vehicle, carriage means including wheel means suspending said vehicle from said track means, control means including fluid motor means drive connected to said wheel means for moving said vehicle along said track means, a fluid control circuit for supplying actuating fluid to said motor means, a manually operable braking system associated with said wheel means for applying a braking effort directly against said wheel means when necessary during normal operation of said vehicle, a normally inoperative emergency braking system including means adapted to grippingly engage said track means, and actuator means responsive to a loss of pressure in said fluid control circuit under emergency conditions to operate said emergency braking system, said fluid control circuit including a main pump for supplying actuating fluid to said motor means, a fluid reservoir, a supercharger pump for supplying makeup fluid from said reservoir to said main pump, and said actuator means being responsive to the pressure of the fluid discharged from said supercharged pump to automatically activate said emergency braking system under emergency conditions.

13. An aerial tramway system as defined in claim 12, wherein said actuator means responds to a loss in pressure of the fluid discharged from said supercharger pump to operate said emergency braking system.

14. An aerial tramway system as defined in claim 12, said fluid control circuit including pressure sensing means responsive to the pressure of the fluid discharged from said motor means to cause said motor means to automatically apply a fluid braking force to said wheel means when said motor discharge pressure reaches a predetermined value, thereby preventing runaway of said vehicle.

15. An aerial tramway system as defined in claim 14, said fluid motor means being of a variable displacement type and including compensator control means which varies the motor displacement in response to changes in the work load on said motor means, and said pressure sensing means cooperating with said compensator means to cause said motor means to apply said fluid braking force.

16. An aerial tramway system as defined in claim 15, wherein said fluid motor means and said main pump are reversible so that said vehicle may be moved in a forward or reverse direction along said track means.

* * * * *